United States Patent [19]
Fahlen et al.

[11] 4,245,195
[45] Jan. 13, 1981

[54] LASER OPTICAL RESONATOR ASSEMBLY

[75] Inventors: Theodore S. Fahlen, San Jose; David J. Clark, Whittier, both of Calif.

[73] Assignee: GTE Products Corporation, Stamford, Conn.

[21] Appl. No.: 57,929

[22] Filed: Jul. 16, 1979

[51] Int. Cl.³ .............................................. H01S 3/08
[52] U.S. Cl. ......................... 331/94.5 C; 331/94.5 D
[58] Field of Search ..................... 331/94.5 C, 94.5 D

*Primary Examiner*—William L. Sikes
*Assistant Examiner*—Léon Scott, Jr.
*Attorney, Agent, or Firm*—John F. Lawler

[57] ABSTRACT

An optical resonator assembly mounted externally on a hermetically sealed gas transport laser comprises a U-shaped tubular bench secured to the laser housing top wall and having an elongated beam with legs extending at right angles to opposite ends, respectively, of the beam adjacent to the front and rear walls of the laser housing. Flat bases depend from the respective bench legs and overlay optical windows in the front and rear housing walls through which the internally generated laser beam passes. The bases have openings aligned with the windows, respectively, and adjustably mount mirror support plates, respectively, adjacent to those openings. Mirrors attached to the support plates define the laser optical cavity. The bench is a rigid tubular structure providing stable support for the optical components and also constituting a fluid conduit for carrying cooling air to minimize thermally induced dimensional changes.

7 Claims, 9 Drawing Figures

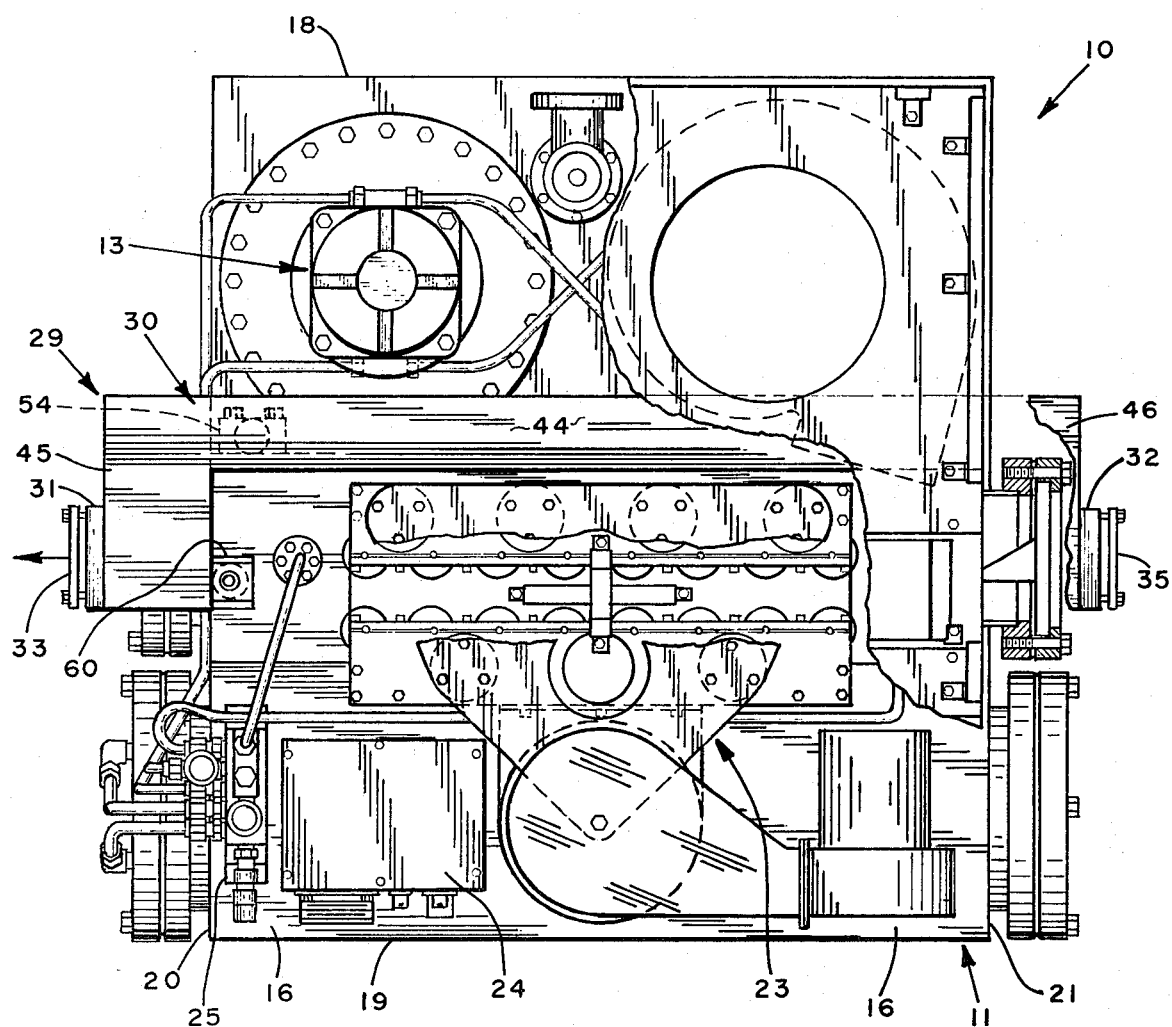
FIG. 2
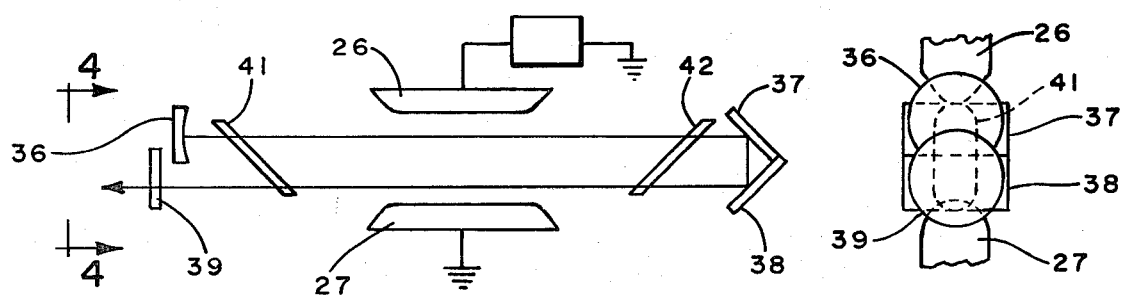
FIG. 3
FIG. 4

LASER OPTICAL RESONATOR ASSEMBLY

RELATED APPLICATIONS

Ser. No. 57,928 COMPACT PULSED GAS TRANSPORT LASER by Fahlen et al.
Ser. No. 57,927 PULSED LASER ELECTRODE ASSEMBLY by Fahlen et al.

BACKGROUND OF THE INVENTION

This invention was made under a contract with the Department of the Air Force.

This invention is related to lasers and more particularly to an improved laser optical resonator assembly.

Certain gas lasers are constructed with a sealed housing or casing in which the gas and electrodes are contained and with resonator mirrors mounted externally of the casing. The advantages of an external resonator are simplified optical adjustments and permanently sealed window assemblies which maintain vacuum or pressure integrity of the interior of the housing. A disadvantage is additional intracavity loss introduced by the windows. One type of external resonator assembly for a gas transport laser of this type is described in a book entitled, "Lasers" by B. A. Lengyel (John Wiley & Sons, New York, 1962), and comprises mirror support plates at the front and rear ends of the laser mounted on an optical bench and extending the full length of the laser. While this external resonator assembly is generally effective, it has the disadvantages of being heavy, unstable, and somewhat bulky.

This invention is directed to an improved resonator assembly which avoids these disadvantages.

OBJECTS AND SUMMARY OF THE INVENTION

A general object of this invention is the provision of a laser resonator assembly which is relatively easy to install and is simple to adjust and maintain.

A further object is the provision of an external laser resonator assembly that is compact and provides a folded optical path through individually adjustable mirrors.

Still another object is the provision of such a resonator assembly that combines structural rigidity and the capability of being readily cooled for minimizing thermally induced dimensional changes.

These and other objects of the invention are achieved with a resonator assembly having a U-shaped tubular bench secured to the top wall of the laser housing and comprising an elongated beam extending the length of the housing and legs adjacent the front and rear walls of the housing for supporting the resonator mirrors. The beam and legs have openings through which cooling air may be circulated for minimizing thermally induced dimensional changes. Base members depending from the legs adjustably mount mirror plates in alignment with the laser discharge zone and optical windows in the adjacent walls of the housing.

DESCRIPTION OF THE DRAWINGS

FIG. 2 is a top plan view of the laser of FIG. 1 with part of the top wall broken away to show details of construction;

FIG. 3 is a simplified schematic representation of the laser electrodes and the optical components of the laser system;

FIG. 4 is an enlarged output end view of the laser optical components as viewed on line 4—4 of FIG. 3;

DESCRIPTION OF PREFERRED EMBODIMENT

Figure 1:
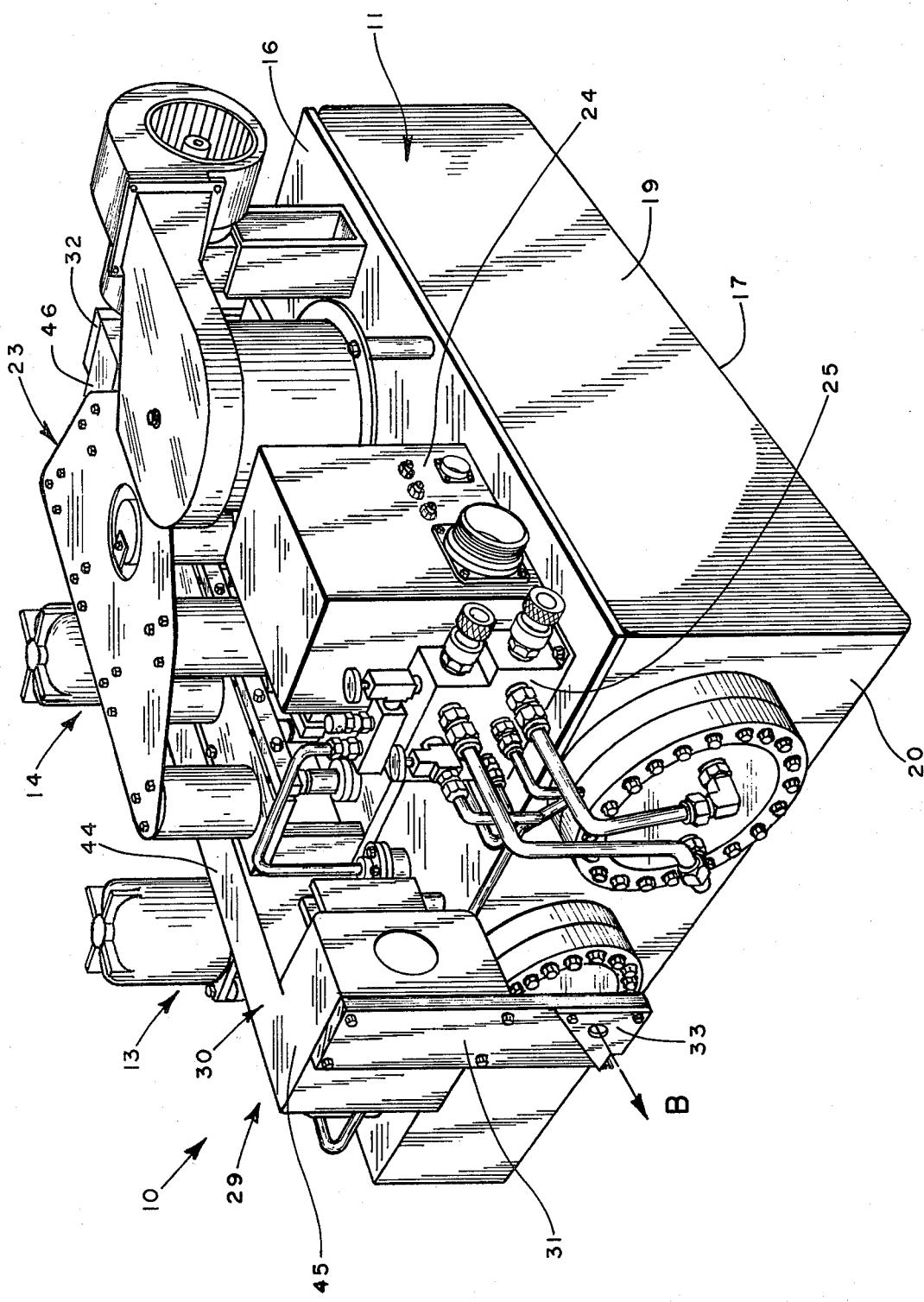
FIG. 1 is a perspective view of a laser embodying the invention.
Figure 5:
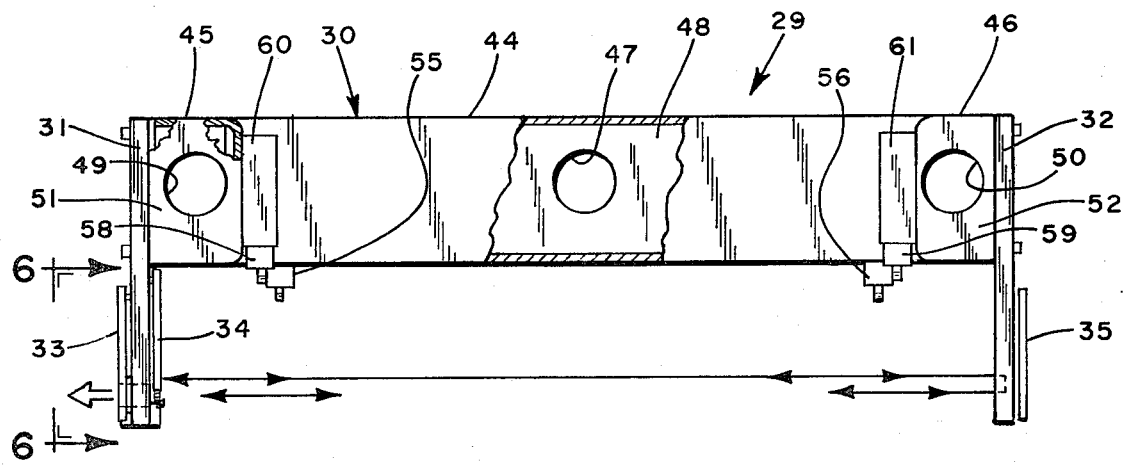
FIG. 5 is a side elevation of the laser optical resonator assembly removed from the laser housing, a part of the structure being broken away to show details of construction.

Referring now to the drawings, FIGS. 1 and 2 show a gas transport laser 10 embodying this invention comprising a hermetically sealed box-like housing 11 in which a gas, such as a xenon-helium mixture, is circulated by two motor-fan assemblies 13 and 14 located at one end of the housing. The properties of xenon-helium mixture are such as to produce a laser beam at wavelengths of 2–4 microns when used as a lasing medium. The housing preferably is made of stainless steel and comprises a top wall 16, a bottom wall 17, end walls 18 and 19 and front and rear walls 20 and 21, respectively. Each of the walls comprises a preferably stainless steel plate brazed to the other walls to form a rigid unitary structure. A pulse forming network 23 is mounted on top wall 16 and is connected to an external high voltage power supply, not shown, through a distribution box 24 for energizing the laser to produce a beam along the laser optical axis B from front wall 20. A coolant, such as water, for the internal parts of the laser is distributed through a manifold assembly 25 which is connected to an outside coolant source, not shown. Laser electrodes comprising a cathode 26 and an anode 27, shown schematically in FIGS. 3 and 4, are sealed within housing 11 and define a discharge zone between them through which gas is circulated at high velocity. The laser output beam axis B is coincident with the discharge zone. The laser system construction and details of the laser electrode assembly are more particularly described in our copending applications Ser. Nos. 57,927 and 57,928, assigned to the assignee of this invention.

In accordance with this invention, an external optical resonator assembly 29 is mounted on top wall 16 of the housing and has an elongated U-shaped bench 30 having downwardly extending bases 31 and 32 overlying front wall 20 and rear wall 21, respectively. Base 31 provides means for adjustably mounting mirror support plates 33 and 34 and base 32 similarly mounts mirror support plate 35.

Referring now to FIGS. 3 and 4, the laser cavity is defined by end mirror 36, right angle mirrors 37 and 38, and output mirror 39, all aligned with the discharge zone between laser cathode 26 and anode 27. Mirrors 36, 37 and 38 are totally reflecting types and outer mirror 39 is partially reflecting so as to transmit the laser output beam. Mirrors 36 and 39 are located adjacent to Brewster window 41 which is sealed to front wall 20 of the laser housing, and mirrors 37 and 38 are located adjacent to and externally of Brewster window 42 similarly sealed to rear housing wall 21. As shown in FIG. 3, the laser beam makes a double pass through the discharge zone for enhancing the gain of the system and reducing the laser beam divergence, the laser cavity length being determined by the length of the optical path between end mirror 36 and output mirror 39. All mirrors are mounted externally of the laser housing as described in more detail below.

Bench 30 is a unitary tubular structure comprising an elongated beam 44 extending the full length of the laser housing and parallel legs 45 and 46 at opposite ends, respectively, of and at right angles to the beam. Beam 44 and legs 45 and 46 have generally rectangular cross sections with their hollow interiors interconnected. This construction together with the U-shaped configuration not only provides a rigid lightweight and generally compact structure but also enables the bench to be cooled by forced air or the like circulating therethrough. To this end, an opening 47 is formed in side wall 48 of beam 44, preferably midway between its ends, and similar openings 49 and 50 are formed in walls 51 and 52 of legs 45 and 46, respectively. Air may be blown through beam wall opening 47 so as to circulate through the structure and exit from leg openings 49 and 50. This minimizes thermally induced dimensional changes in bench 30 and enhances the optical stability of the structure.

The bench is secured to top wall 16 of housing 11 by brackets, one of which is indicated at 54 in FIG. 2, fastened by anti-vibration or shock mountings 55 and 56 to beam 44 and by similar shock mountings 58 and 59 secured to brackets 60 and 61, respectively, on the inner walls of the legs.

Secured to the outer walls of legs 45 and 46 are bases 31 and 32 which extend downwardly, as viewed, from the legs to overlay front and rear housing walls and the laser beam axis B. Base 31 adjacent the housing front wall supports mirror support plates 33 and 34 on its outer and inner sides, respectively, and mirror support plate 35 is mounted on the outer side of base 32.

Figure 6:
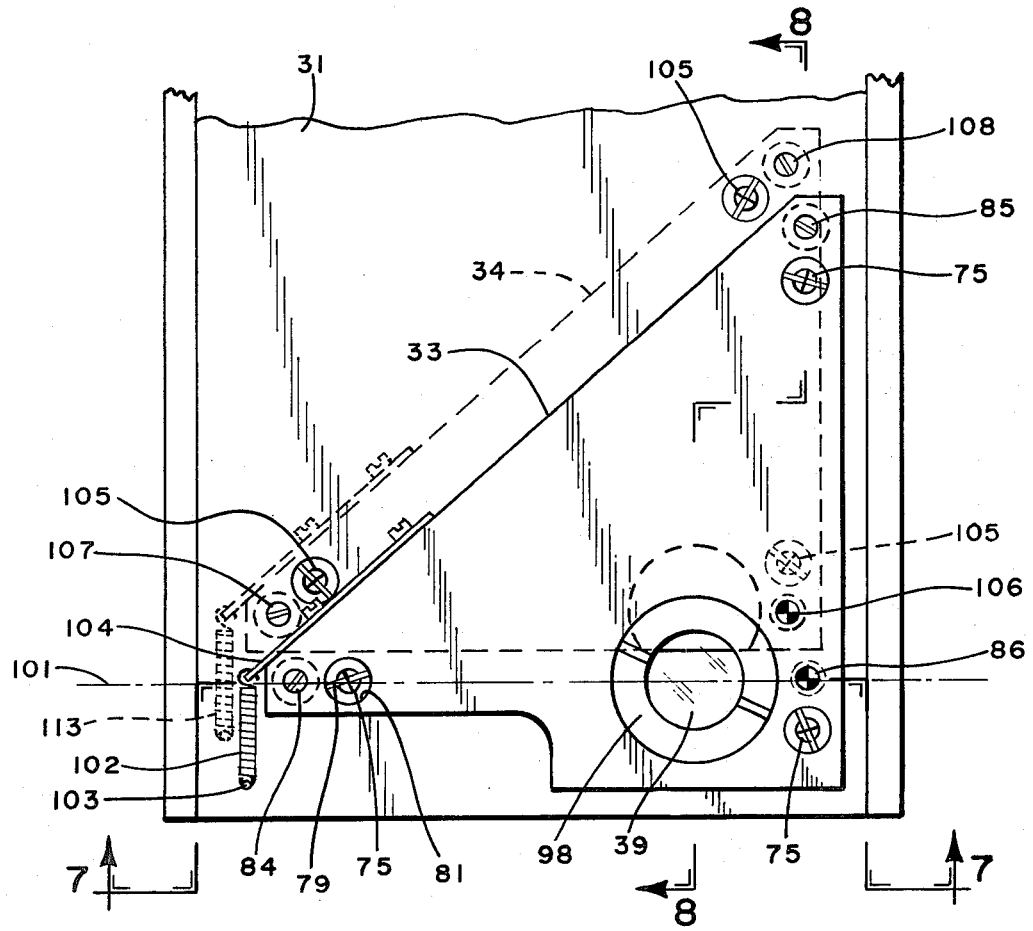
FIG. 6 is a greatly enlarged front end view of the base and the associated mirror support plates as viewed on line 6—6 of FIG. 5.
Figure 7:
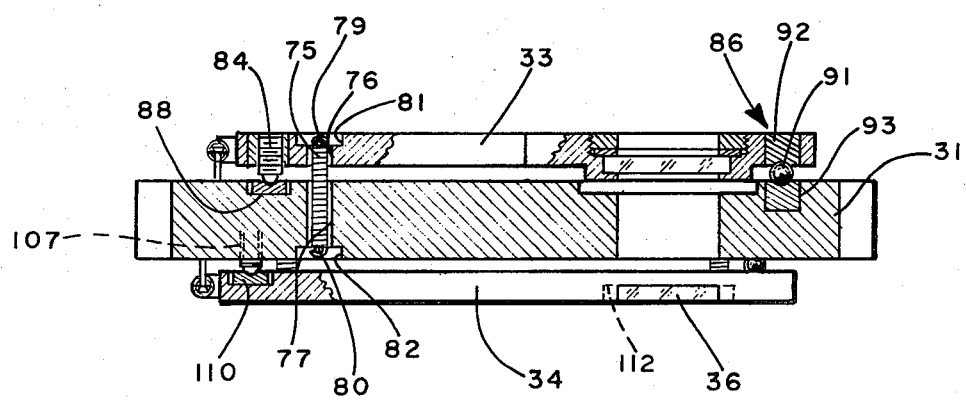
FIG. 7 is a transverse section taken on line 7—7 of FIG. 6.
Figures 8, 9:
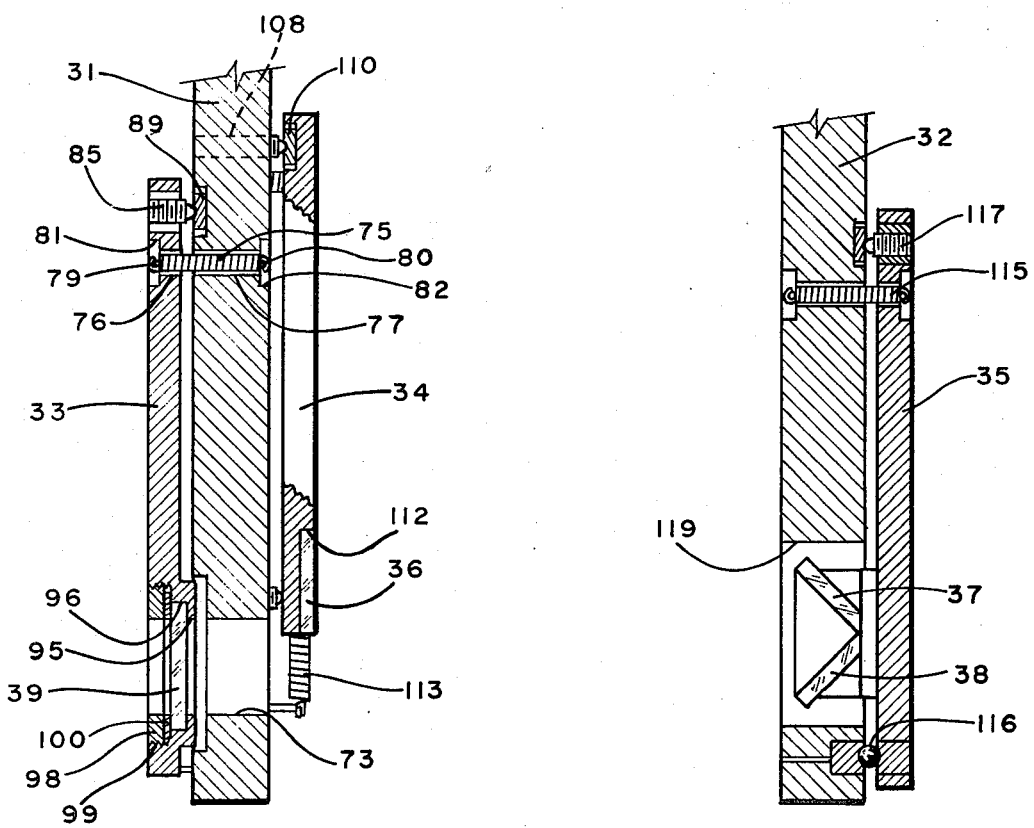
FIG. 8 is a section taken on line 8—8 of FIG. 6.
FIG. 9 is a section similar to FIG. 8 showing the opposite or rear base and associated mirror support plate.

Referring now to FIGS. 6, 7 and 8, base 31 is a flat plate-like member having a circular opening 73 aligned with the lower portion of the laser discharge zone. Plate 33 has a generally triangular shape and is supported on the outer side of base 31 by springs 75 which extend through aligned apertures 76 and 77 in plate 33 and base 31, respectively. Each spring 75 is anchored at its opposite ends to pins 79 and 80, respectively, disposed in recesses 81 and 82 in opposite faces of plate 33 and base 31. Springs 75 preferably are located at each of the three corners of the plate 33. Adjustment of the plane of plate 33 relative to base 31 is accomplished by means of adjustment screws 84 and 85 at the two corners of plate 33 remote from opening 73 in base 31 in conjunction with a pivot 86 located adjacent to opening 73. Screws 84 and 85 threadedly engage plate 33 and abut against seats 88 and 89, respectively, in base 31. Pivot 86 comprises a spherical ball 91 between seats 92 and 93 in plate 33 and base 31, respectively. Rotation of screw 84 causes plate 33 to pivot toward and away from base 31 about a line through pivot 86 and the other adjustment screw 85. Similarly, rotation of screw 85 produces rotation of plate 33 toward and away from base 31 about a line through a pivot 86 and adjustment screw 84.

Plate 33 has a mirror opening 95 facing base 31 and an adjacent coaxial cylindrical recess 96 adapted to receive output mirror 39. A lock ring 98 threadedly engaged in outer recess 99 of plate 33 presses a gasket 100 against mirror 39 to lock same in place. Mirror 39 preferably is made of germanium and is anti-reflection coated on one side for less than 4% reflectivity at the operating wavelength of the laser.

It should be noted that line 101 between pivot 86 and adjustment screw 84 passes through the axis of mirror 39 and is perpendicular to a similar line through pivot 86 and the other adjustment screw 85. In order to prevent rotation of plate 33 parallel to the plane of base 31 during adjustment of screws 84 and 85, a spring 102 anchored to a pin 103 in base 31 is connected to an anchor strip 104 on plate 31.

Inner plate 34 is mounted on the side of base 31 facing Brewster window 41 in the laser housing. By means of springs 105 at the corners of the plate, a pivot 106 at the inner corner of the plate, and adjustment screws 107 and 108 at the outer corners of the plate, the plane of plate 34 is rotated relative to base 31. Thus the connection and adjustment of plate 34 relative to base 31 is the same as for plate 33 except that adjustment screws 107 and 108 threadedly engage base 31 and abut against seats 110 on plate 34. This permits adjustment of plate 34 to be made from the outer side of base 31.

The lower inside surface of inner plate 34 is formed with a recess 112 into which end mirror 36 is secured by an epoxy or the like. Mirror 36 has concave surface with a high reflectivity coating to provide greater than 99% reflectivity at the operating wavelength of the laser. Plates 33 and 34 are positioned on base 31 relative to each other so that the center of end mirror 36 is vertically aligned with the center of output mirror 39 and with end mirror 36 above and slightly overlapping output mirror 39. Plate 34 is also anchored by an anti-rotation spring 113.

Mirror support plate 35 adjacent rear wall 21 of the housing is mounted on base 32 in the same manner as described above for plates 33 and 34 by means of a connecting spring 115, a pivot 116, and adjusting screw 117. Base 32 has an opening 119 adapted to receive right angle reflecting mirrors 37 and 38 cemented together and held by epoxy or the like to plate 35. Pivot 116 is located adjacent to mirror 37 so that rotation of screw 117 permits rotation of plate 68 relative to base 64 in the plane of the drawing (FIG. 9). An additional adjustment screw and spring, not shown, are provided to permit adjustment of plate 35 perpendicular to the plane of the drawing. With plates 33, 34 and 35 properly adjusted, mirrors 36 and 37 are aligned with each other as are mirrors 38 and 39 so as to produce a laser beam path through the discharge zone as described above in connection with FIGS. 3 and 4. Mirrors 37 and 38 preferably are made of quartz and have greater than 99% reflectivity at the operating wavelength of the laser.

What is claimed is:

1. In combination with a laser with a hermetically sealed housing having a top wall and laterally spaced parallel side walls intersecting said top wall, electrodes within said housing extending in a direction transversely of said side walls and defining therebetween a discharge gap, means for energizing said electrodes for producing an electric discharge across said gap, Brewster windows in said side walls, respectively, and aligned with said gap, the improvement of an optical resonator assembly comprising:

a bench secured to said top wall having an elongated beam and parallel legs secured to and extending at right angles to opposite ends, respectively, of said beam, a base secured to each of said legs and extending over said window in the adjacent side wall,
said bases having apertures aligned with said windows, respectively, and
mirror means mounted on said bases, respectively, in alignment with said apertures and defining the optical resonator of the laser.

2. The combination according to claim 1 in which said beam and legs are a unitary structure.

3. The combination according to claim 2 in which said beam and said legs are hollow tubular members.

4. The combination according to claim 3 in which said beam and said legs have openings therein whereby to permit circulation of a gas therethrough for cooling same.

5. The combination according to claim 1 in which said bases have plates pivotally mounted thereon and overlying said apertures, and means for adjustably pivoting said plates relative to said bases, said mirror means being secured to said plates.

6. The combination according to claim 5 in which said mirror means comprises a right angle mirror mounted on one of said bases and first and second mirrors mounted on the other of said bases, said first mirror and said right angle mirror being totally reflecting, said second mirror being partially transmissive whereby to transmit the output from said laser.

7. The combination according to claim 6 in which said right angle mirror has first and second plane reflecting surfaces formed perpendicular to each other, said first and second mirrors being offset from each other and aligned with said first and second surfaces, respectively.

* * * * *